United States Patent [15] 3,677,085
Hayakawa [45] July 18, 1972

[54] TANDEM-TYPE HOT-WIRE VELOCITY METER PROBE

[72] Inventor: Hideo Hayakawa, Yokohama, Japan

[73] Assignee: Yugen Kaisha Tsukasa Sokken, Tokyo, Japan

[22] Filed: April 8, 1970

[21] Appl. No.: 26,638

[52] U.S. Cl. .................................................. 73/204
[51] Int. Cl. ......................................... G01f 1/00
[58] Field of Search .................................... 73/204

[56] References Cited

UNITED STATES PATENTS 3,352,154   11/1967   Djorup ............................... 73/204 X
3,498,127   3/1970    Richards ............................ 73/204
1,902,427   3/1933    Sawyer ............................... 73/204
3,147,618   9/1964    Benson ............................... 73/204
3,366,942   1/1968    Deane ................................ 73/204 X

FOREIGN PATENTS OR APPLICATIONS 1,270,864   6/1968    Germany ............................. 73/204
  395,123   7/1933    Great Britain ....................... 73/204

Primary Examiner—Richard C. Queisser
Assistant Examiner—C. E. Snee, III
Attorney—Waters, Roditi, Schwartz & Nissen

[57] ABSTRACT

An improved tandem-type hot-wire velocity meter probe for the measurement of flow velocity of liquids and/or gases, comprising two hot-wire members disposed in tandem at upstream and downstream ends of an insulating support member placed in the flow path (e.g., a pipe or a conduit) of the fluid under measurement. The upstream or leading end hot-wire member has its downstream or trailing side buried or otherwise concealed in the insulating support member, while the downstream-end hot-wire member has its upstream side similarly buried or otherwise concealed therein, so that the exposed surfaces of the two hot-wire members indicate a difference between their rates of heat transfer to the fluid in proportion to the flow rate thereof. This difference can be obtained in terms of a difference in electrical resistance between the hot-wire members by means of a meter incorporated in a bridge circuit including the hot-wire members. There are also disclosed herein several examples of the improved flowmeter probe all conforming to the above basic configuration of the two hot-wire members and the support member.

6 Claims, 7 Drawing Figures

PATENTED JUL 18 1972   3,677,085
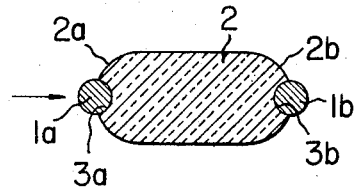
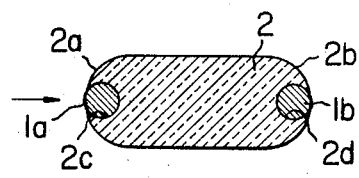
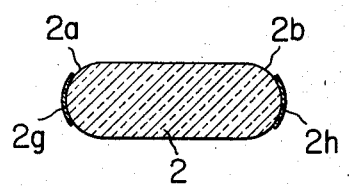
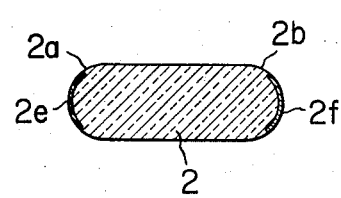
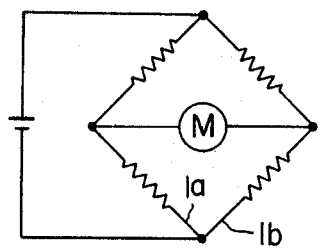
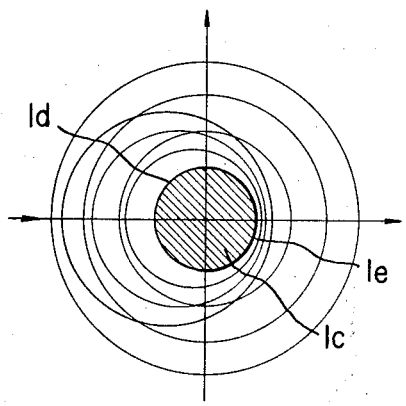

TANDEM-TYPE HOT-WIRE VELOCITY METER PROBE

BACKGROUND OF THE INVENTION

This invention relates to an improved velocity meter probe. More specifically, the invention relates to an improved tandem-type hot-wire velocity meter probe for the electrothermic measurement of flow velocity of liquids and/or gases (hereinafter referred to by the generalized term "fluid") by means of hot-wire members in tandem arrangement.

An electrothermic measuring instrument analogous, but no doubt inferior, to the present invention has already found a widespread use in anemometry. Called the "hot-wire anemometer," it is now used extensively for the measurement of the velocity of a steady flow of air or a gas. In principle, the hot-wire anemometer is designed to measure the velocity of air or a gas in terms of a change in the temperature, obtained through a change in the electrical resistance, of a single electrically heated wire (i.e., the hot wire) as it is cooled in the fluid under measurement.

The transfer of heat to the fluid from the hot wire placed therein consists of the twofold process of (1) the heating by the hot wire of the portion of the fluid surrounding it and (2) the carrying away of the heated portion by the flow. Stated illustratively, the hot wire in the fluid produces a consistent surrounding layer of the heated portion (hereinafter referred to simply as"heated boundary layer"). The thickness of this heated boundary layer is subject to change in accordance with the flow velocity of the fluid, becoming less with increase in the flow velocity.

The heated boundary layer mentioned above has a great influence upon the response characteristics of hot-wire velocity meters in general. That is, in the event the flow speed is reduced or even decreased to zero, the heated boundary layer around the hot wire shows a corresponding increase in thickness as above and thus causes a time lag in the speed at which the velocity meter responds to the change in the flow velocity. This time lag is the length of time needed for the hot wire to form a new heated boundary layer of the fluid therearound and depends on the heat capacity and/or viscosity coefficient of the fluid and other factors.

Hence, the thickened layer around the hot wire, as a result of the more or less reduced flow velocity of the fluid, impairs the response characteristics of the meter to fluctuations in the flow velocity, especially when the velocity stepwisely becomes zero. Furthermore, when the flow velocity is decreased, the velocity meter becomes inordinately sensitive to the slightest relative displacements of its hot wire and the fluid, such as those caused by mechanical or acoustical vibrations, thus giving rise to errors in measurement.

The conventional hot-wire velocity meter possesses another serious drawback in that it is unable to sense the direction of the flow in the event of rapid, intermittent fluctuations in the flow velocity of the fluid. This drawback is all the more serious because, even when the velocity of flow as measured in a given cross section of an adequate flow path (e.g., a tube or a conduit) of the fluid becomes rapidly zero, a localized flow thereof is still present in the path. The result is that the conventional velocity meter probe, with provision made for only one hot wire, is incapable of measuring exact flow velocities of a fluid in the cross section of its flow path.

SUMMARY OF THE INVENTION

All of the above deficiencies accompanying the conventional hot-wire velocity meters, as typified by the hot-wire anemometer, are successfully overcome by the present invention which, in fact, affords a distinct improvement in electrothermic measurement.

It is thus a primary object of the invention to provide an improved hot-wire velocity meter probe incorporating two hot-wire members in tandem arrangement for the measurement of flow velocities of liquids and/or gases from a difference in the heat transfer rate therebetween.

Another object of the invention is to provide an improved hot-wire velocity meter probe which manifests a highly dependable response characteristic even when the fluid under measurement is flowing considerably slowly, since the undesirable effects of the heated boundary layers produced by the two hot-wire members are nullified by virtue of counteraction therebetween.

Still another object of the invention is to provide an improved hot-wire velocity meter probe capable of highly exact measurement of flow velocities of a fluid even assuming relative displacements between the fluid and the hot-wire members due to mechanical or acoustical vibrations, since these vibrations, too, are counterbalanced as they act commonly upon both of the two hot-wire members.

A further object of the invention is to provide an improved hot-wire velocity meter probe capable of sensing the direction of flow besides measuring the flow velocities in a cross section of an adequate flow path (e.g., a tube or a conduit) even when the flow velocity decreases stepwisely rapidly down to zero.

An additional object of the invention is to provide an improved hot-wire velocity meter probe whereby the flow velocity of a fluid with considerable irregular fluctuations can be measured both accurately and speedily.

These and the various ancillary objects as well as the novel features that are considered characteristic of the invention will become more apparent and understandable from the following detailed description of currently preferred embodiments thereof when read in conjunction with the accompanying drawings.

BRIEF DESCRIPTION OF THE DRAWING

In the drawing:

FIGS. 1 (A), (B), (C), (D) and (E) are cross-sectional views showing preferred embodiments of the invention;

FIG. 2 is an explanatory connection diagram, illustrated by way of example only, of the tandem-type hot-wire velocity meter probe of the invention; and FIG. 3 is an explanatory diagram showing a mode of transfer of heat from a cylindrical solid body to a fluid in which it is placed.

DETAILED DESCRIPTION OF THE INVENTION

The most characteristic feature of the tandem-type hot-wire velocity meter probe of the invention resides, of course, in the use of two hot-wire members in tandem arrangement, i.e., at upstream and downstream ends of an approximately flat shaped support member made of an electrically and thermally insulating material.

Referring now to the drawings, FIG. 1(A) through FIG. 1(E), inclusive, illustrate five preferred embodiments of the invention all conforming to the above fundamental constitution. In FIG. 1(A), slots $3a$ and $3b$ are respectively formed in the middle of an upstream or leading end $2a$ and a downstream or trailing end $3b$ of a support member 2, which is for example made of glass, the slots $3a$ and $3b$ being formed to such a depth that approximately half the cross section of hot-wire members or hot elongated members $1a$ and $1b$ are respectively buried therein. The hot-wire members $1a$ and $1b$ are further bonded in the slots $3a$ and $3b$.

Also in FIG. 1(B), slots $2c$ and $2d$ of such a depth that hot-wire members $1a$ and $1b$ are buried nearly completely therein are formed in the middle of the upstream end $2a$ and downstream end $2b$ of the support member 2. The hot-wire members $1a$ and $1b$ are respectively buried in the slots $2c$ and $2d$, with adequate exposure permitted therefrom, in such a manner that both the upstream end $2a$ and downstream end $2b$ of the support member 2 offer scarcely any protrusions of the hot-wire members $1a$ and $1b$ buried therein.

FIG. 1(C) illustrates still another example of the velocity meter probe of the invention, wherein a paste like insulating substance, for example, enamel or lacquer, is solidified integrally with hot-wire members $1a$ and $1b$ placed on both sides thereof in parallel with each other.

FIG. 1(D) illustrates yet another example, wherein tapes 2e and 2f of an adequate width which are made of an electric conductor are bonded to the upstream and downstream ends 2a and 2b of the support member 2.

Yet a further example is shown in FIG. 1(E), wherein films 2g and 2h of an electric conductor are formed at the upstream and downstream ends 2a and 2b of the support member by the process of vacuum deposition.

The probe as above described may be used with its two hot-wire members 1a and 1b forming two arms of a bridge circuit incorporating a meter M as illustrated in FIG. 2, the meter M affording reading of a difference in electrical resistance between the wires, The meter pointer will stand at a standstill with the flow speed at zero, deflecting in proportion thereto.

The operation of the tandem-type hot-wire velocity meter probe of the invention, having the above described fundamental constitution, will now be described hereinbelow.

Generally, the upstream side and downstream side of an object placed in a flow of a fluid show different rates of heat transfer (Nusselt's number) to the fluid therefrom, the difference therebetween increasing with increase in the flow velocity of the fluid. Now, let it be assumed that the velocity meter probe illustrated in FIG. 1(A), is placed in a fluid flowing in a direction in conformity with the "upstream" and "downstream" designations of the probe ends. Only the upstream half of the circumferential surface of the hot-wire member 1a buried at the upstream end 2a of the support member 2 is in contact with the fluid, thus transferring heat thereto, whereas the downstream half of the circumferential surface of the hot-wire member 1a is concealed in the support member 2 so that there is no transfer of heat to the fluid therefrom. On the other hand, only the downstream half of the circumferential surface of the hot-wire member 1b at the downstream end 2b of the support member 2 is in contact with the fluid, thus also transferring heat thereto, while the upstream half thereof is similarly concealed in the support member 2 so that heat is not transferred to the fluid therefrom.

As a result, the hot-wire member 1a and the hot-wire member 1b transfer heat to the fluid at different rates.

A corresponding difference in electrical resistance therebetween can be obtained by means of a meter (M) connected as illustrated in FIG. 2 between the hot-wire members.

To elaborate further upon the above phenomenon, suppose that a cylindrical solid body 1c approximating in cross-sectional shape to the hot-wire members 1a and 1b is placed in a flow of a fluid as in FIG. 3, in which is shown the distribution pattern of the rate of imagined heat transfer from the body 1c to the fluid. The flow at the upstream side 1d thereof is forced apart so that the flow velocity is increased there. At the downstream side 1e of the body 1c, on the other hand, where the fluid tends to stand stagnant, the flow velocity is low. Hence, the rate of transfer of heat from the body 1c is different at every circumferential point thereof, being high at the upstream side 1d and low at the downstream side 1e.

The above phenomenon is effectively utilized by the present invention, wherein the two hot-wire members are disposed in tandem arrangement in such a manner that the downstream half of the circumferential surface of the upstream-end hot-wire member 1a and and upstream half of the circumferential surface of the downstream-end hot-wire member 1b are buried in the support member 2 made of insulating material. Consequently, in contrast to the conventional single-hot-wire probe that has measured the flow velocity from an average heat transfer rate over the whole circumferential surface of the single hot wire, the invention makes it possible to achieve a more exact, rapid measurement of the flow speed on the basis of a difference in the heat transfer rate between the exposed upstream half of the hot-wire member 1a and the exposed downstream half of the hot-wire member 1b.

Althouth the invention has been described hereinbefore with respect to the measurement of flow speed, it will be understood that the velocity meter may be used as a flowrate meter with equal effectiveness.

I claim:

1. In a tandem-type hot-wire velocity meter probe comprising two hot elongated members disposed respectively upstream and downstream of a fluid flow of which the velocity is to be measured, and means located intermediately of said two elongated members, the improvement wherein said means comprises a support member for said elongated members, said support member being made of insulating material and having an essentially elliptical cross-sectional configuration, the ends of the major axis of said ellipse defining respectively rounded upstream and downstream ends of said support member in the path of said fluid flow, each of said hot elongated members being almost entirely buried in, respectively, said rounded upstream and downstream ends to form the substantially smooth outer surfaces of said ends, said elongated members and said support member being rigidly interconnected with each other.

2. The velocity meter probe as claimed in claim 1, wherein said elongated members are in the form of wires or rods and respectively buried more or less in slots formed in the middle of the upstream end and downstream end of said support member.

3. The velocity meter probe as claimed in claim 1, wherein said support member is in the form of a paste-like insulating substance, which is solidified integrally with said elongated members on both sides.

4. The velocity meter probe as claimed in claim 1, wherein said elongated members are in the form of tapes of an adequate width which are made of an electric conductor, said tapes being bonded respectively to the upstream and downstream ends of said support member.

5. The velocity meter probe as claimed in claim 1, wherein said elongated members are films of an electric conductor material formed by vacuum deposition.

6. The velocity meter probe as claimed in claim 1, wherein said elongated members form arms of a bridge circuit incorporating a meter which is adapted to indicate the difference in electrical resistance between said elongated members which corresponds to said difference in the heat transfer rate therebetween.

* * * * *